United States Patent
Vaughan et al.

(10) Patent No.: US 9,952,001 B2
(45) Date of Patent: Apr. 24, 2018

(54) RE-CORABLE COAXIAL HOSE SYSTEM

(75) Inventors: Brandon Vaughan, Romeo, MI (US);
James Kirchoff, Romeo, MI (US);
Mark Portelli, Romeo, MI (US)

(73) Assignee: St. Clair Systems, Romeo, MI (US)

( * ) Notice: Subject to any disclaimer, the term of this patent is extended or adjusted under 35 U.S.C. 154(b) by 1094 days.

(21) Appl. No.: 13/982,353

(22) PCT Filed: Jan. 27, 2012

(86) PCT No.: PCT/US2012/022901
§ 371 (c)(1),
(2), (4) Date: Jan. 9, 2014

(87) PCT Pub. No.: WO2012/103437
PCT Pub. Date: Aug. 2, 2012

(65) Prior Publication Data
US 2014/0124178 A1 May 8, 2014

Related U.S. Application Data

(60) Provisional application No. 61/436,981, filed on Jan. 27, 2011.

(51) Int. Cl.
*F16L 9/18* (2006.01)
*F28F 1/00* (2006.01)
(Continued)

(52) U.S. Cl.
CPC .............. *F28F 1/00* (2013.01); *F16L 53/002* (2013.01); *F28D 7/106* (2013.01); *F28F 9/0253* (2013.01);
(Continued)

(58) Field of Classification Search
CPC ........... F16L 53/002; F28F 1/00; F28F 9/0253
(Continued)

(56) References Cited

U.S. PATENT DOCUMENTS 2,410,912 A * 11/1946 Wenk ..................... F16L 39/00
165/154
2,700,988 A * 2/1955 Smisko .................. F16L 35/00
138/109

(Continued)

FOREIGN PATENT DOCUMENTS

JP     2002162175 A * 6/2002

OTHER PUBLICATIONS

Machine Translation of JP 2002-162175A.*

*Primary Examiner* — Vishal Pancholi
(74) *Attorney, Agent, or Firm* — Young Basile

(57) ABSTRACT

The Re-Corable Coaxial Hose System allows temperature control to be added around material-carrying tubing in both new and existing dispensing systems. The jacketing system seals around the material-carrying tube and allows a thermal transfer fluid to be circulated in the resulting annular space so as to change the temperature of the material being dispensed. Because the system is comprised of a series of tubing and hoses it is flexible and can be routed around corners and through wire tracks and can be used in both manual and robotic applications. Because the seals around the material-carrying tube can be released and subsequently re-sealed, the internal material-carrying tube can be replaced, defined as "re-coring" the hose assembly.

9 Claims, 2 Drawing Sheets

(51) Int. Cl.
 *F16L 53/00* (2018.01)
 *F28F 9/02* (2006.01)
 *F28D 7/10* (2006.01)

(52) U.S. Cl.
 CPC ......... *F28F 9/0256* (2013.01); *F28F 2230/00* (2013.01); *F28F 2255/02* (2013.01)

(58) Field of Classification Search
 USPC .................................................. 138/114, 113
 See application file for complete search history.

(56) References Cited

U.S. PATENT DOCUMENTS

| | | | | |
|---|---|---|---|---|
| 3,934,618 | A * | 1/1976 | Henderson | F16L 9/18 138/114 |
| 4,506,705 | A * | 3/1985 | Thompson | F16L 55/132 138/89 |
| 5,097,898 | A * | 3/1992 | Verkaart | A61M 5/44 165/142 |
| 5,287,913 | A * | 2/1994 | Dunning | B05C 5/001 137/340 |
| 6,009,908 | A * | 1/2000 | Hartnagel | B60H 1/00342 138/109 |
| 6,098,704 | A * | 8/2000 | Tsuchiya | B21C 23/10 165/154 |

* cited by examiner

RE-CORABLE COAXIAL HOSE SYSTEM

BACKGROUND

The present invention relates in general to hose systems and jackets. More particularly the present invention pertains to a flexible temperature control hose systems.

In many dispensing operations it is necessary to hold the liquid being dispensed at a specific temperature in order to stabilize characteristics such as viscosity. This is generally done with a traditional heat exchanger, often of plate, tube-in-tube or shell-and-tube construction. While reasonably effective in changing the temperature of the material being dispensed, the heat exchanger is traditionally located a distance from the actual point at which the fluid is dispensed. The heat exchanger is generally of a rigid construction and therefore not amenable to use in a motion application. Motion is often required in order to place the fluid in its proper location(s) and this generally results in the use of tubing or hose material to convey the material from the heat exchanger to the moving "gun" or other dispensing apparatus.

As the fluid moves through the tubing or hose, the temperature established in the heat exchanger is influenced by the ambient air surrounding the hose. The magnitude of that influence is directly related to the difference between the outlet temperature of the heat exchanger and the ambient temperature. In general, though the outlet temperature of the heat exchanger may be consistent, ambient temperature values generally vary from morning to evening, resulting in a varying rate of change in temperature.

Tubing insulation is often employed in an attempt to minimize the impact of changes in ambient temperature. However, it is important to note that, while insulation will slow the migration of thermal energy, it will not stop it. This can be addressed to some extent with air conditioning systems to control ambient temperature, but this is both expensive and difficult to implement when the area to be controlled is large (like a factory setting) or the desired material dispensing temperature is significantly above or below the normal human ambient environment of 65° F.-85° F.

In previous applications known to the inventors (Dunning and Cline, et. al., U.S. Pat Nos. 5,287,913 and 5,363,907), the fluid conveying hose is encased in a larger hose and temperature conditioned thermal transfer fluid circulated through the annular space formed between the outside of the inner hose and the inside of the outer hose. This configuration, in essence, creates a flexible tube-in-tube heat exchanger useful for controlling the temperature of the fluid being dispensed.

Some of the most significant issues with this configuration are the means necessary to create the coaxial configuration. These are generally comprised of a series of blocks and connections that transition from the original conveyance to this flexible coaxial configuration. These systems are often bulky and heavy. This is deleterious to both manually and robotically applied systems. Such heavy bulky systems can create fatigue in operators and require added force and energy to accomplish robotic applications. Additionally, the transition from the original conveyance to this flexible coaxial configuration generally involves gaps, threads, or the like which can trap material and create problems with the dispensing system that include, but are not limited to clogged nozzles, contamination, etc. The contamination issue is often significant in this type of system when it is necessary to switch from one material being dispensed to another and the two materials are not chemically compatible. One non-limiting example would be changing from one point to another where contamination between colors or chemistries could significantly alter the quality of the finished product. In such instances it is common practice to change the hoses or tubes conveying the material to eliminate the possibility of contamination. With the aforementioned configuration, the coaxial hose must be changed out or rebuilt, either of which requires significant time and expense.

Thus it would be desirable to provide a system or device to that could provide thermal insulation to hoses and tubing while eliminating or minimizing problems associated with systems employed to date.

SUMMARY

Disclosed herein is hose system configured to provide or add temperature control around material-carrying tubing in both new and existing fluid dispensing systems. The hose system disclosed herein seals around the material-carrying tube and allows a thermal transfer fluid to be circulated in the resulting annular space so as to change the temperature of the material being dispensed. Because the system is comprised of a series of tubes and hoses, it is flexible and can be routed around corners and through wire tracks and can be used in both manual and robotic applications. Because the seals around the material-carrying tube can be released and subsequently resealed, the internal material-carrying tube can be replaced, defined as "re-coring" the hose assembly.

BRIEF DESCRIPTION OF THE DRAWINGS

The figures and drawings of the invention included with and within this disclosure are as follows.

DETAILED DESCRIPTION

The hose assembly system disclosed herein provides a device that can surround a material-carrying tubing in a manner that minimizes or eliminated transitions in said material carrying tube. The associated material-carrying tube can be either an existing material-conveying tube already present in a system or can be new material-conveying tubing.

The hose assembly system as disclosed herein includes at least one outer tube body and at least one compressible elastomeric seal or seal system that seals around an associated material-carrying tube to form an annular space through which a thermal transfer fluid can be circulated in order to accomplish a specified temperature control function. Because these elastomeric seals can be released and subsequently resealed around the associated material-carrying tube, said internal material-carrying tube can be replaced, defined as "re-coring" the hose assembly.

The device disclosed herein significantly reduces the time and expense associated with replacing the material conveying tubing. The outer tubing in the device disclosed herein is composed of lightweight, flexible tubing or hose material as well as suitable blocks composed of a suitable structural material, including but not limited to aluminum or plastic. The configuration permits the assembly to be routed around corners and through the same path followed by the unjacketed material conveying tube and presents only a small increase in weight, dimensions, and little resistance, making it ideal for both manual and robotic applications.

Figure 1:
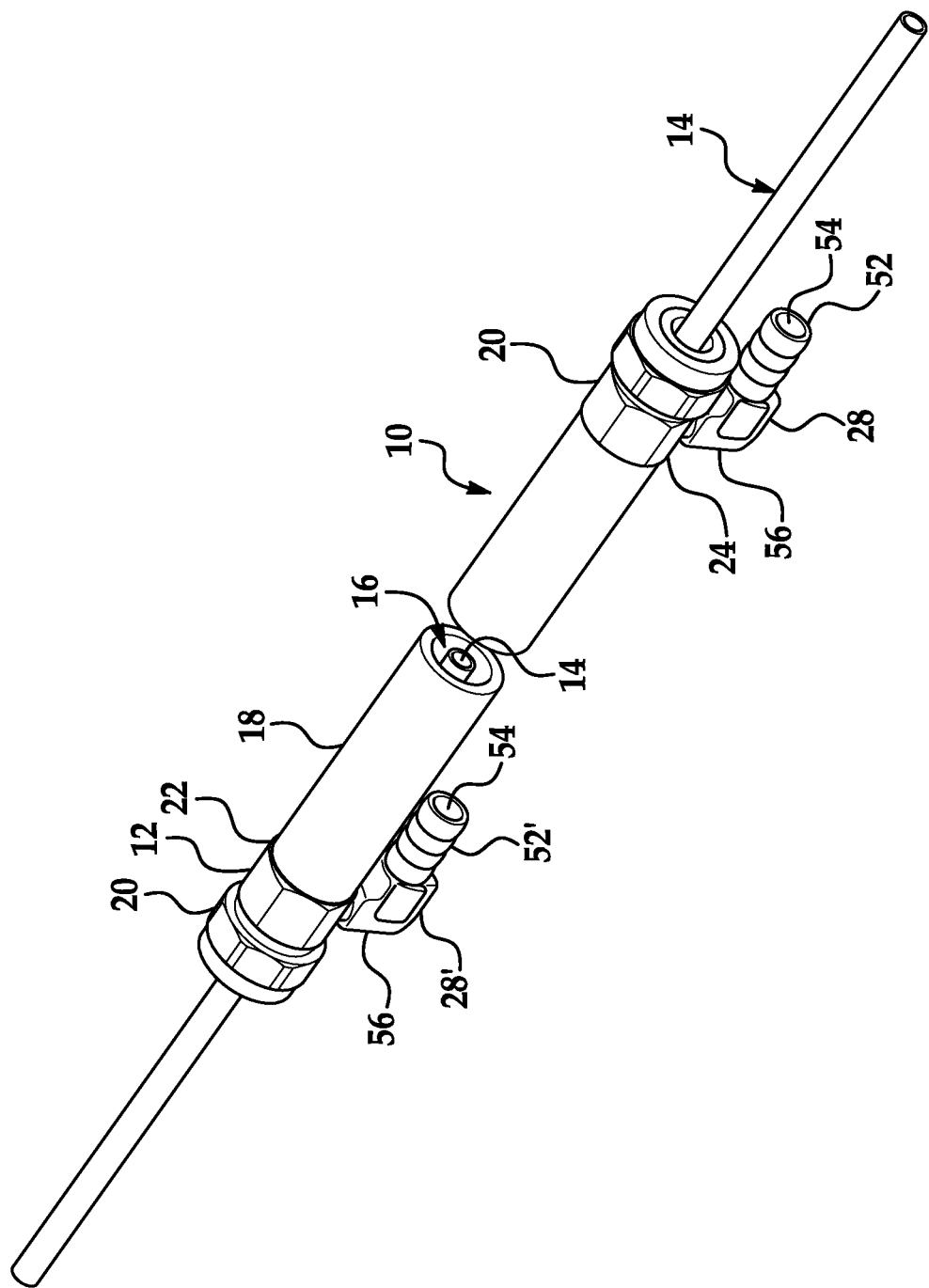
FIG. 1 is an orthographic view of an embodiment of the hose assembly disclosed herein.

The device disclosed herein can be used in various industries that require the conveying of fluids at a controlled temperature and is applicable to processes A non-limiting embodiment of the device 10 disclosed herein is shown in FIG. 1. Here we can see an outer hose assembly 12 in place around the material conveying tube 14. For purposes of illustration, the outer hose assembly 12 and associated material conveying tube are shown in broken form in order to illustrate the internal relationship of material conveying tube 14 and outer hose assembly 12. The coaxial orientation of the outer hose assembly 12 around the material conveying tube 14 forms an annular space 16 between the outside diameter of the material conveying tube 12 and the inside diameter of the outer hose assembly 10 through which thermal transfer fluid can be circulated to change and/or condition the temperature of the fluid contained in the material conveying tube 12.

The break in the center of FIG. 1 is representational only, intended to show coaxial configuration and the resulting annular space. Both internal and external tubing/hose sections are continuous throughout the length of the device 10 and the assembly may be constructed in any length required. The outer hose assembly 12 includes at least one outer hose jacket member 18 connected to at least one block assembly 20 in fluid tight engagement to the associated hose jacket member 18. In various embodiments and applications, it is contemplated that the device 10 will include block assemblies 20, 20' located at first and second ends 22, 24 of the associated outer hose jacket member 18.

The length of the material conveying tube 14 is set by the distance between its connection points within the dispensing system. The length of the outer hose assembly 12 may be determined by specific thermal requirements of the associated fluid application system but will always be of a length less than that of the material conveying tube or conduit 14.

The device 10 composed of the outer hose assembly 12 hose can be configured to provide a re-corable coaxial hose system relative to the material conveying hose or conduit 14 and the associated fluid dispensing system.

Figure 2:
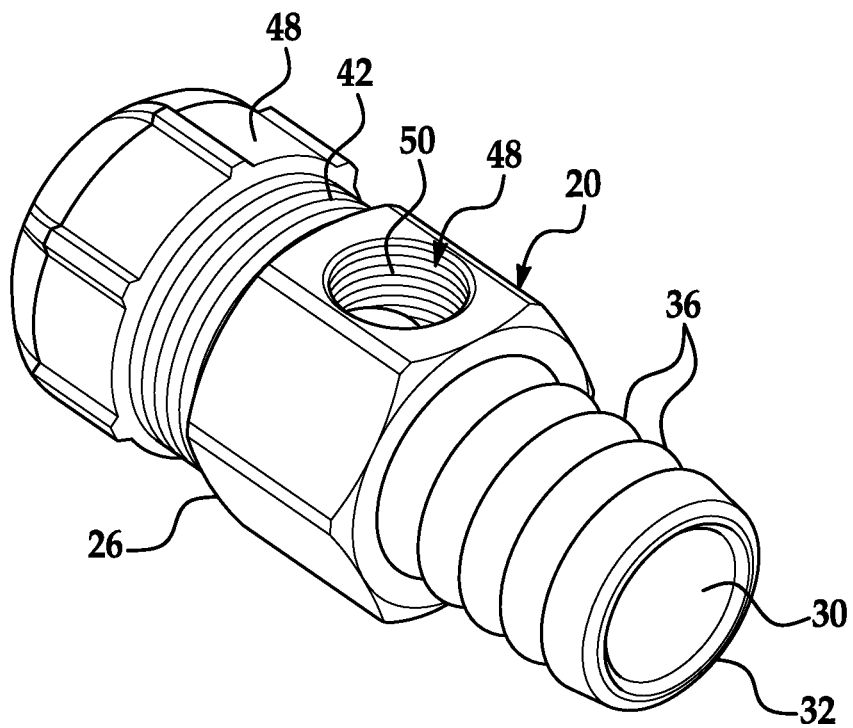
FIG. 2 is an orthographic view of an embodiment of a block assembly that can be used (in pairs) in association with an embodiment of the hose assembly as disclosed herein.
Figure 3:
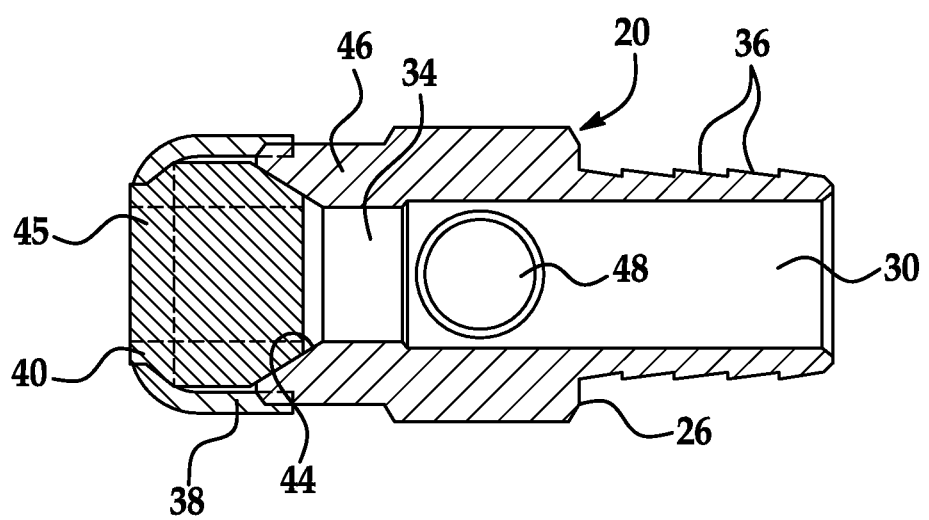
FIG. 3 is a cross sectional view of the block assembly of FIG. 2.

The device 10 can include at least one suitably configured block assembly positioned at either the first or second end 22, 24 of the outer hose jacket 18 or both. An embodiment of the block assembly 20, 20' is depicted orthographically in FIG. 2 and in cross sectional view in FIG. 3. The block assembly 20, 20' can be machined, molded or otherwise formed from a suitable material. The material of choice can be a material exhibiting at least some insulative characteristics. Non-limiting examples of such materials include various metals such as aluminum, steel, copper, various polymeric materials, ceramic materials and the like. It is contemplated that each block assembly 20, 20' include a central body portion 26 that can be produced from a single block of material. Each block assembly 20, 20 can also include a thermal fluid conditioning barb 28, 28' insertably positioned in the central body portion 26. The thermal fluid conditioning barb 28, 28' will be discussed in greater detail subsequently.

The central body portion 26 of the block assembly or assemblies 20, 20' can have any suitable configuration. In the embodiment depicted in the drawing figures, the central body portion 26 is composed of an elongated member that can be configured as a generally cylindrical element. The central body portion 26 defines a through shaft 30 that extends from a first end 32 to a second end 34. The first end 32 is configured with a suitable tube engaging surface that can engage the interior of the region of the outer hose jacket member 18 in a fluid tight manner. In the embodiment depicted in the drawing figures the tube engaging region proximate to the first end 32 of the central body portion 26 is configured with at least one barb 36. The at least one barb 36 can be pressed into an associated region of the outer hose jacket member 18 and sealed in a suitable manner. Non-limiting examples of suitable sealing means include either mechanical clamping means and/or adhesive means.

The though shaft 30 defined in the central body portion 26 is configured to define an internal passage through which the material conveying tube 14 as well as thermal transfer fluid can both pass.

The block assembly 20,20' can also include at least one threaded or press-fit port region 38 located at the second end of the 34 of the central body portion 26 into which a liquid-tight fitting 40 can be installed. The fitting seal 40 is configured with a central shaft 45 that can be oriented coaxial to the shaft 30 defined in the central body 26 when the device 10 is in the use position. This configuration facilitate the passage of the thermal transfer fluid into or out of the annular space formed between the outside diameter of the material conveying tube 14 and the inside diameter of the outer hose jacket 18 hose disclosed herein.

In the embodiment depicted in the drawing figures, the block assembly 20, 20' also includes an externally threaded end 42 located proximate to the second end of the central body portion 26 at an orientation opposite the at least one barb 36. The externally threaded end 42 also defines an internal region 44 having a concave taper 46 into which a compatibly tapered elastomeric seal 40 can be fitted and onto which a threaded cap 46 can be screwed to force the tapered end 46 of the elastomeric seal 40 into the mating taper 44 in the end 34 of central body portion 26, compressing the central shaft 45 of the seal 40 from a first internal diameter that permits insertion of the material conveying conduit 14 therein to a second internal diameter to seal around the outside diameter of the material conveying tube 14.

The central body portion 26 also includes a side shaft 48 oriented perpendicular to the shaft 30 in fluid communication therewith. The side shaft is located in the central body portion 26 at a location between the first end 32 and the elastomeric seal 40. The side shaft 48 can be configured to engage a suitable thermal fluid conditioning barb 28, 28' in fluid tight mating engagement with the central body 26. In the embodiment depicted in the drawing figures, the side shaft 48 is configured with and internally oriented threaded surface 50 that can matingly engage a suitable outwardly threaded surface defined on the thermal fluid conditioning barb 28, 28'.

The thermal fluid conditioning barb 28, 28' can be suitably configured to transfer suitable thermal conditioning fluid from an associated source to the device 10. The thermal conditioning barb 26, 26' can include a suitable barb region 52, 52' that is located distal to the outwardly threaded region (not shown) that matingly engages the side shaft 48. The thermal conditioning fluid barb also has a shaft 54 defined therein extending from the barb end to the opposed end. In the embodiment depicted in the drawing figures, the thermal conditioning barb 26, 26' also is configured with a suitable elbow 56 that oriented the shaft in a suitable angle, such as a 90 degree angle in the drawing figures. The barb region 52, 52' engages a suitable thermal conditioning fluid conveying conduit (not shown) to convey thermal conditioning fluid to or away from the device 10.

In order to assemble the system as disclosed herein, a material conveying hose 14 is cut to the proper length as determined either by the material conveying tube or the required thermal length, whichever is shorter. A hose jacket member 18 is cut to a sufficient length. At least one block assembly 26, 26' is installed in each end of the hose jacket member 18 by pressing the associated barb fitting 36 into the associated end of the hose jacket member 18 and securing it with an adhesive or a mechanical band clamp such as a screw, Oetiker or other type of fastening member in order to form a liquid tight seal with the internal diameter of the hose jacket member 18. The tapered elastomeric seal 40 is inserted into the taper 44 formed in the end 38 of each block assembly 26, 26' and loosely retained by threading the compression cap 48 over it and onto the threaded end 42 of the block assembly 26, 26'. The diameter of the hole through the elastomeric seal is determined by the material conveying tube 14 against which it is designed to seal and is large enough to provide a clearance hole when the seal is not compressed. An appropriate fitting for the thermal transfer fluid connection such as thermal conditioning fluid barb 26, 26' is installed into the port on the side of each block assembly 26, 26' as indicated. Specifics as to the size and type of connection are to be determined by the flow rate and thermal transfer fluid required as set forth from the thermal design calculations for the associated system. The resulting assembly is the Re-Corable Coaxial Hose.

To install the Re-Corable Coaxial Hose in position, one end of the material conveying tube 14 can be removed from its connection point in the associated dispensing system and fed through the hole through the elastomeric seal 40. The Re-Corable Coaxial Hose is slid over the material conveying tube 14 until it passes through the hole through the elastomeric seal on the other end. The material conveying tube 14 can, then, be reconnected to the associated dispensing system. The Re-Corable Coaxial Hose is then slid into position and the compression cap on each end is tightened to compress the elastomeric seal onto the outside diameter of the material conveying tube 14 so as to be watertight, but not collapse the tube. The thermal transfer fluid circulation system is then connected to the fittings on the Re-Corable Coaxial Hose device 10 and the air can be bled from the system. The installation is then complete.

It is important to note that in many dispensing systems, a multiple component compound is dispensed. In these situations, the Re-Corable Coaxial Hose can be used in multiples, one for each component. These can all be connected to the same thermal transfer fluid circulation system to operate at the same temperature, or they can be connected to separate systems to allow the components to be maintained at different temperatures prior to mixing. In this type of system, yet another Re-Corable Coaxial Hose can be used to control the temperature of the multiple-component material after it is mixed. A non-limiting example would be materials such as epoxies where cooling is employed to control cure rate which can be accelerated by the exothermic reaction of the epoxy after mixing.

To "Re-Core" the assembly, the compression caps 48 are loosened and the thermal transfer fluid is drained from the Re-Corable Coaxial Hose Assembly 10. The material conveying tube 14 is disconnected from the dispensing system and pulled out through the center of the Re-Corable Coaxial Hose Assembly 10 after which a new material conveying tube is pushed through in its place and reconnected to the associated dispensing system. The Re-Corable Coaxial Hose assembly 10 is then repositioned and the compression caps 48 on each end is tightened to compress the associated elastomeric seal 40 onto the outside diameter of the new material conveying tube 14 so as to be watertight, but not collapse the tube. The thermal transfer fluid circulation system is then restarted and the air purged from the system. The "Re-Coring" process is now complete.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A thermal fluid transfer hose system comprising:
   at least one outer hose jacket member having a first end and an opposed second end and an interior channel located therebetween; and
   at least one block assembly, the block assembly defining a central shaft extending therethough, the block assembly in fluid-tight connection to either the first or second end of the outer hose jacket member such that the central shaft extending through the block assembly and the interior channel defined in the outer jacket hose are in coaxial engagement with one another, wherein the outer hose jacket and the at least one block assembly are configured to receive a process fluid and define a process fluid conveying conduit therethrough and to define and annular region between an outer wall of the process fluid conduit and the inner wall of the outer hose jacket member, wherein the at least one block assembly comprises:
   a central body having a first end and an opposed second end with the central shaft extending therethrough, the first end of the central body of the at least one block assembly having a hose jacket member engaging region and the second end of the central body of the at least one block assembly having a fluid seal engaging region;
   a fluid seal composed of a compressible elastomeric material, the fluid seal having seal body, the seal body having a first end and an second end opposed to the first end, the first end of the seal body having a first fluid seal surface configured to contact the seal engaging region defined in the central body of the block assembly and wherein the second end of the fluid seal body has a second fluid seal surface opposed to the first fluid seal surface— and a central shaft extending from the first end of the seal body to the second end of the seal body, wherein the central shaft defined in the seal body of the fluid seal has an inner diameter that can vary between a compressed inner diameter value and an uncompressed inner diameter value wherein the compressed inner diameter value is smaller than the uncompressed diameter value and wherein the fluid seal further includes an outer side surface, the outer side surface coaxially disposed relative to the central shaft, the outer side surface having an outer diameter, the outer diameter of the outer side surface having a compressed outer diameter value and an uncompressed outer diameter value, wherein the compressed outer diameter value is greater than the uncompressed outer diameter value a compression cap in releasable contact with the central body, the compression cap in contact with the second end of the fluid seal, the compression cap moveable from a first position wherein the central shaft defined in the fluid seal is at the first inner diameter value and a second position wherein the central shaft defined in the fluid seal is at the second inner diameter, the compression cap having a central aperture concentrically disposed relative to the central shaft, the central aperture having an inner diameter that is greater than the inner diameter of the central shaft such that a portion of the second end of the fluid seal portion is exposed when the thermal fluid transfer hose system is in a use position.

2. The thermal transfer hose system of claim 1 further comprising wherein an internal surface of the channel defined in the block assembly and the external surface of the process fluid conveying hose define an annular thermal transfer fluid conveying channel therebetween.

3. The thermal transfer hose system of claim 2 wherein the coaxial process fluid conveying hose is in fluid-tight engagement with the block member and wherein the assembly further comprises a seal.

4. The thermal transfer fluid hose system of claim 1 wherein the system includes two block assemblies, wherein the block assemblies are connected to the respective first and second ends of the outer hose jacket member and wherein the process transfer fluid conveying hose extends through the outer hose jacket member and associated block assemblies such that the process fluid transfer conduit projects outward beyond the block assemblies.

5. The thermal transfer fluid hose system of claim 1 wherein the wherein the coaxial process fluid conveying hose is in fluid-tight engagement with the block member and wherein the assembly further comprises a seal.

6. The fluid transfer system of claim 1 wherein the first face the seal body of the fluid seal composed of elastomeric material has a frustoconical surface, the frustoconical surface configured to engage a mating surface defined in the seal engaging region of the central body, wherein the outer side surface of the seal body of the fluid seal is coaxially disposed relative to the central shaft when uncompressed and wherein the frustoconical surface terminates at and is connected to the side surface.

7. The fluid transfer system of claim 6 wherein the seal engaging region of the central body has a taper surface configured to releasably engage the frusotconical surface of the fluid seal.

8. The fluid transfer system of claim 6 wherein the seal body of the fluid seal has a second end configured to project to a plane coplanar with an outer surface of the compression cap.

9. A thermal fluid transfer hose system comprising:

at least one outer hose jacket member having a first end and an opposed second end and an interior channel located therebetween; and at least one block assembly, the block assembly defining a central shaft extending therethough, the block assembly in fluid-tight connection to either the first or second end of the outer hose jacket member such that the central shaft extending through the block assembly and the interior channel defined in the outer jacket hose are in coaxial engagement with one another, wherein the outer hose jacket and the at least one block assembly are configured to receive a process fluid and define a process fluid conveying conduit therethrough and to define and annular region between an outer wall of the process fluid conduit and the inner wall of the outer hose jacket member, wherein the at least one block assembly comprises:

a central body having a first end and an opposed second end with the central shaft extending therethrough, the first end of the central body of the at least one block assembly having a hose jacket member engaging region and the second end of the central body of the at least one block assembly having a fluid seal engaging region;

a fluid seal composed of a compressible elastomeric material, the fluid seal having seal body, the seal body having a first end and an second end opposed to the first end , the first end of the seal body having a first fluid seal surface configured to contact the seal engaging region defined in the central body of the block assembly and wherein the second end of the fluid seal body has a second fluid seal surface opposed to the first fluid seal surface and a central shaft extending from the first end of the seal body to the second end of the seal body;

a compression cap in releasable contact with the central body, the compression cap in contact with the second end of the fluid seal, the compression cap moveable from a first position wherein the central shaft defined in the fluid seal is at the first inner diameter value and a second position wherein the central shaft defined in the fluid seal is at the second inner diameter, the compression cap having a central aperture concentrically disposed relative to the central shaft, the central aperture having an inner diameter that is greater than the inner diameter of the central shaft such that a portion of the second end of the fluid seal portion is exposed when the thermal fluid transfer hose system is in a use position.

* * * * *